United States Patent
Layman et al.

(10) Patent No.: US 12,250,341 B2
(45) Date of Patent: Mar. 11, 2025

(54) TELEPHONE NUMBER MONITORING

(71) Applicant: AVOXI, Atlanta, GA (US)

(72) Inventors: Randy Layman, Marietta, GA (US); Barbara Dondiego-Stewart, Smyrna, GA (US); Keith Meyers, Senoia, GA (US); Matthew Nichols, Lakewood, CO (US); Robert Rushton, Pelham, AL (US); Zach Pate, Cumming, GA (US)

(73) Assignee: AVOXI, INC., Atlanta, GA (US)

( * ) Notice: Subject to any disclaimer, the term of this patent is extended or adjusted under 35 U.S.C. 154(b) by 190 days.

(21) Appl. No.: 18/155,241

(22) Filed: Jan. 17, 2023

(65) Prior Publication Data

US 2024/0244132 A1    Jul. 18, 2024

(51) Int. Cl.
*H04M 3/32* (2006.01)
*H04M 3/22* (2006.01)
*H04M 3/36* (2006.01)

(52) U.S. Cl.
CPC ......... *H04M 3/323* (2013.01); *H04M 3/2218* (2013.01); *H04M 3/36* (2013.01)

(58) Field of Classification Search
CPC ............................ H04M 3/323; H04M 3/2218
See application file for complete search history.

(56) References Cited

U.S. PATENT DOCUMENTS

| | | | | |
|---|---|---|---|---|
| 5,809,108 A * | 9/1998 | Thompson | ........... | H04Q 11/045 379/27.04 |
| 5,933,475 A * | 8/1999 | Coleman | .............. | H04B 17/391 379/1.02 |
| 7,643,616 B1 * | 1/2010 | Dianda | ................. | H04M 3/323 379/9 |
| 2002/0028659 A1 * | 3/2002 | Adams | .................... | H04L 43/50 455/67.11 |
| 2002/0167936 A1 * | 11/2002 | Goodman | ............. | H04M 3/323 370/352 |
| 2002/0167937 A1 * | 11/2002 | Goodman | ........... | H04L 12/6418 370/352 |

(Continued)

FOREIGN PATENT DOCUMENTS

| | | | | |
|---|---|---|---|---|
| CN | 115277946 A | * | 11/2022 | |
| EP | 2490423 A1 | * | 8/2012 | ............ H04M 3/323 |

(Continued)

*Primary Examiner* — Akelaw Teshale
(74) *Attorney, Agent, or Firm* — Carlson, Gaskey & Olds, P.C.

(57) ABSTRACT

A system for monitoring phone numbers includes a computing device having at least one processor and memory associated with the processor. A telephone network supports a plurality of telephone numbers. The computing device is configured to obtain data directly from the telephone network. The data indicates call activity involving the phone numbers, respectively, during a time period having a preselected duration. The computing device determines, for each of the phone numbers, whether the data indicates that there were no successfully answered calls placed to the phone number during the time period. For any such phone number, the computing device places a test call to the phone number. In the event that the test call is not successful, the computing device provides an indication of a problem with the phone number.

12 Claims, 2 Drawing Sheets

(56) References Cited

U.S. PATENT DOCUMENTS

| | | | | |
|---|---|---|---|---|
| 2005/0271029 A1* | 12/2005 | Iffland | ............... | H04M 7/006 |
| | | | | 370/348 |
| 2008/0254790 A1* | 10/2008 | Baldridge | ............ | H04M 3/5116 |
| | | | | 455/424 |
| 2013/0114802 A1* | 5/2013 | Hodge | ............... | H04M 17/10 |
| | | | | 379/88.22 |
| 2015/0201067 A1* | 7/2015 | Chen | ............... | H04M 3/2281 |
| | | | | 379/45 |
| 2023/0328121 A1* | 10/2023 | Cartwright | ............. | G10L 15/22 |
| | | | | 709/224 |

FOREIGN PATENT DOCUMENTS

| | | | | | |
|---|---|---|---|---|---|
| EP | 2536113 | A1 * | 12/2012 | ............ | H04M 3/323 |
| EP | 3499858 | A1 * | 6/2019 | ............ | H04M 15/00 |
| WO | WO-0022804 | A1 * | 4/2000 | ............ | H04M 3/323 |

* cited by examiner

TELEPHONE NUMBER MONITORING

BACKGROUND

Telephone number monitoring is useful to identify problems with equipment dedicated to a particular number or the network equipment associated with directing calls to that number. Typical monitoring techniques include manually calling numbers to identify any problems. That approach introduces several inefficiencies including additional cost, additional personnel, unnecessarily testing numbers that are fully functional, and delays between a time when a number begins experiencing a problem and remediation of the problem. Any such delays are inconvenient and can prove costly to consumers of telephony services who rely on functional phone numbers to conduct their business. Service providers also need to provide reliable service to maintain their customer relationships.

SUMMARY

An illustrative example method of monitoring a phone number includes automatically generating data indicating call activity involving a phone number during a time period having a preselected duration, automatically determining that the data indicates that there were no successfully answered calls placed to the phone number during the time period, automatically placing a test call to the phone number based on determining that there were no successfully answered calls placed to the phone number during the time period, automatically determining whether the test call was successful, and automatically generating an indication of a problem with the phone number if the test call was not successful.

In an example embodiment having at least one of the features of the method of the previous paragraph, the data includes an answer-seizure ratio and the method comprises determining whether the answer-seizure ratio is below a preselected threshold and generating an indication of a potential problem with the phone number when the answer-seizure ratio is below the threshold.

In an example embodiment having at least one of the features of the method of any of the previous paragraphs, the data includes a duration of any calls during the time period and the method comprises determining an average call duration during the time period and generating an indication of a potential problem with the phone number when the average call duration during the time period is shorter than average call durations during previous time periods.

In an example embodiment having at least one of the features of the method of any of the previous paragraphs, the data includes information regarding call originating locations of calls placed to the phone number and the method comprises generating an indication of a potential problem associated with any location including failed attempted calls to the phone number.

In an example embodiment having at least one of the features of the method of any of the previous paragraphs, the preselected duration is based on expected call activity involving the phone number.

In an example embodiment having at least one of the features of the method of any of the previous paragraphs, the preselected duration is an hour.

An example embodiment having at least one of the features of the method of any of the previous paragraphs includes performing the entire method on a telephony platform that comprises at least one processor and memory associated with the at least one processor.

An illustrative example embodiment of a system for monitoring phone numbers includes a computing device and a telephone network. The computing device includes at least one processor and memory associated with the processor. The telephone network includes a plurality of telephone numbers. The computing device is configured to: obtain data directly from the telephone network, the data indicating call activity involving the phone numbers, respectively, during a time period having a preselected duration; automatically determine, for each of the phone numbers, whether the data indicates that there were no successfully answered calls placed to the phone number during the time period; automatically place a test call to any of the phone numbers for which there were no successfully answered calls placed to the phone number during the time period; for each of the phone numbers to which a test call was placed, automatically determine whether the test call was successful; and for any of the phone numbers to which the test call was not successful, automatically generate an indication of a problem with the phone number.

In an example embodiment having at least one of the features of the system of any of the previous paragraphs, the data includes an answer-seizure ratio and the computing device is configured to determine whether the answer-seizure ratio is below a preselected threshold and generate an indication of a potential problem with an identified one of the phone numbers when the answer-seizure ratio of the identified one of the phone numbers is below the threshold.

In an example embodiment having at least one of the features of the system of any of the previous paragraphs, the data includes a duration of any calls during the time period and the computing device is configured to determine an average call duration for each of the phone numbers during the time period and generate an indication of a potential problem with an identified one of the phone numbers when the average call duration for the identified one of the phone numbers during the time period is shorter than average call durations for the identified one of the phone numbers during previous time periods.

In an example embodiment having at least one of the features of the system of any of the previous paragraphs, the data includes information regarding call originating locations of calls placed to the phone numbers and the computing device is configured to generate an indication of a potential problem associated with any location including failed attempted calls to any of the phone numbers.

The various features and advantages of an example embodiment will become apparent to those skilled in the art from the following detailed description. The drawings that accompany the detailed description can be briefly described as follows.

DETAILED DESCRIPTION

Figure 1:
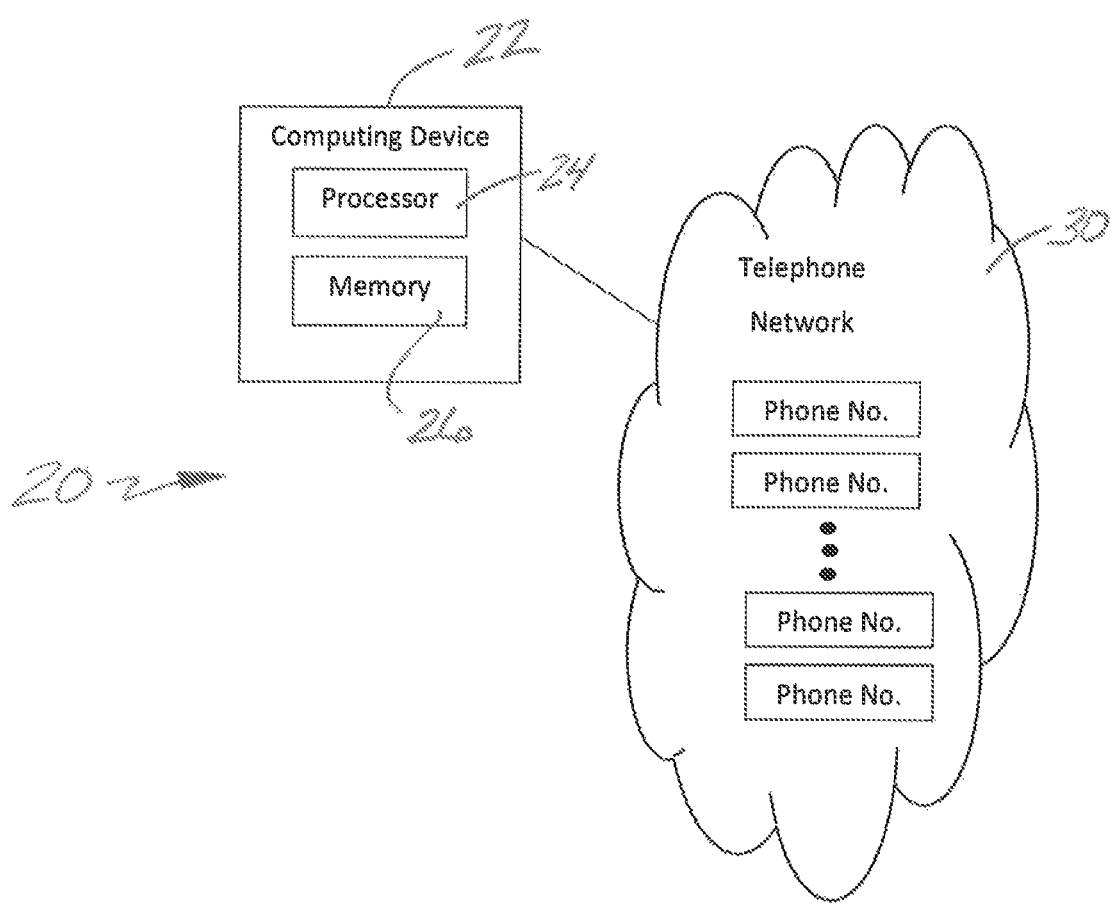
FIG. 1 schematically illustrates selected portions of an example embodiment of a system for automatically monitoring phone numbers.

Embodiments of this invention provide automated phone number monitoring. An example embodiment of a system 20 that is configured to monitor phone numbers is schematically shown in FIG. 1. A computing device 22, which is particularly configured or programmed to be part of a telephony platform, includes at least one processor 24 and memory 26 associated with the processor 24. The computing device 22 is schematically illustrated as a single device for discussion purposes. Some embodiments include multiple devices, such as a plurality of processors that are part of a cloud computing network.

The computing device 22 is linked to or otherwise has access to a telephone network 30 that includes known equipment to facilitate calls in a known manner. The telephone network 30 supports a plurality of phone numbers 32.

The computing device 22 monitors each of the phone numbers 32 to determine whether any of the phone numbers 32 is malfunctioning. The computing device 22 obtains data directly from the telephone network 30 and uses that data to determine the call activity for each of the phone numbers 32. The call activity corresponds to information or data that may be included in call detail records, such as the calling number, the called number, whether the call was answered, and call duration. In some embodiments, the computing device 22 is configured or programmed to determine the call activity by operating like at least one of a session border controller or a session initiation protocol (SIP) application server.

The data obtained by the computing device 22 corresponds to actual call activity for each phone number during a time period having a preselected duration. The computing device 22 determines whether the call activity during that time period includes at least one successfully answered call placed to each of the phone numbers 32 during the time period. The length of time considered important may vary depending on the expected or observed use of the phone numbers 32 under consideration. For example, some phone numbers are typically used in a manner that includes receiving multiple calls every hour and the time period is one hour or a segment of an hour. In some circumstances, such as during holidays or off-hours, a phone number may not be called for several consecutive hours and the duration of the time period used to monitor the phone number is correspondingly longer than an hour.

For any phone number 32 that does not have any successfully answered calls during the time period under consideration, the computing device 22 automatically places a test call to that phone number 32. For example, the processor 24 includes a calling module that automatically places a call to the phone number 32 that has been identified as not having any successful calls during the time under consideration. In some embodiments, the processor 24 makes an application programming interface (API) call to another portion of the telephony platform that places the call to the phone number 32 that is being tested.

The computing device 22 determines whether the test call was successful and, if not, generates an indication of a problem with that phone number 32. The indication may be, for example, a report to a customer using the phone number or a service provider that services the phone number.

Figure 2:
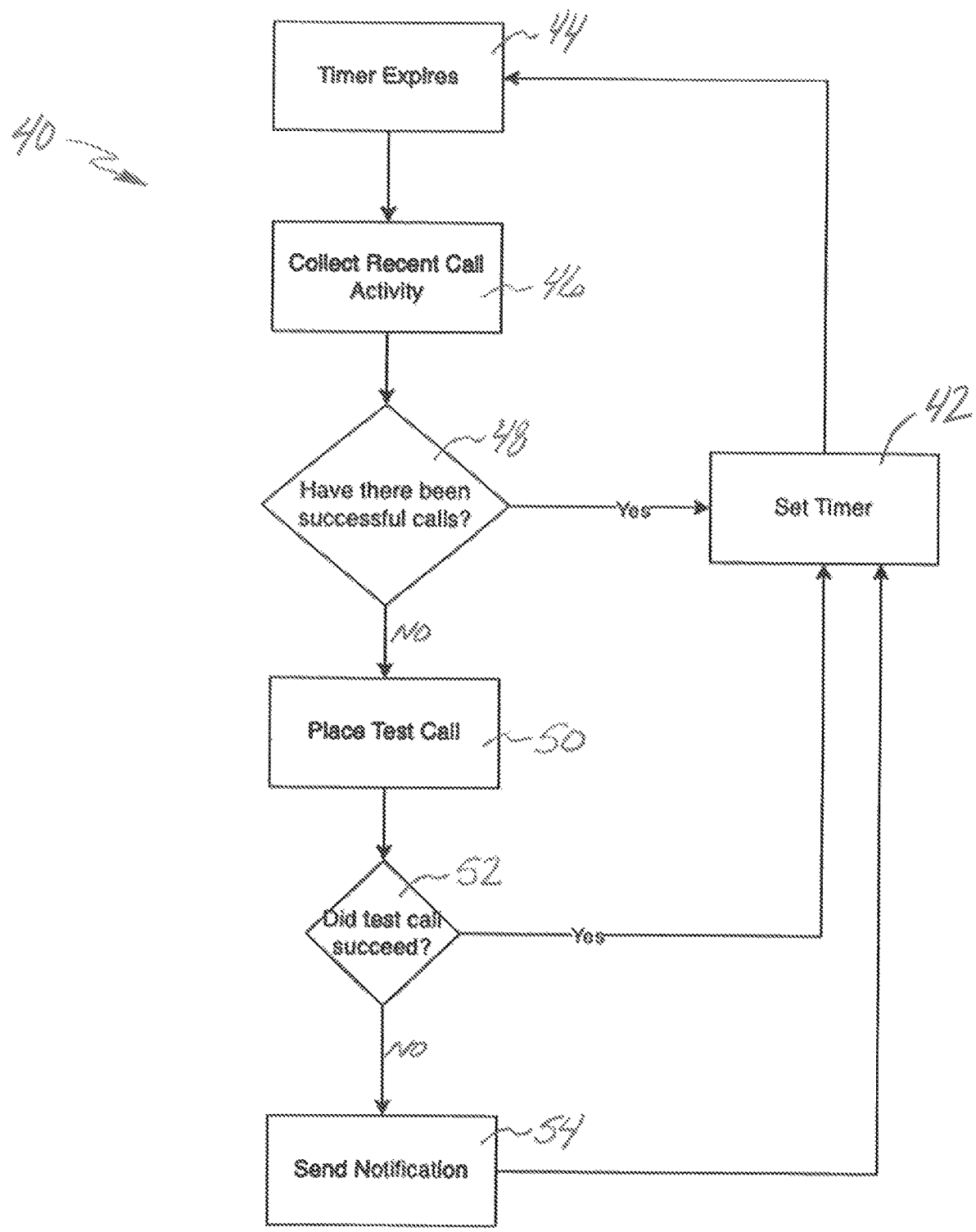
FIG. 2 is a flowchart diagram summarizing an example method of monitoring telephone numbers.

FIG. 2 is a flowchart diagram 40 that summarizes an example method of monitoring the phone numbers 32. At 42, the computing device 22 sets a timer having a preselected duration corresponding to a useful period of time for testing at least one of the phone numbers 32. In many embodiments, a set of phone numbers 32 will have the same or very similar expected use so the timer set at 42 applies to multiple phone numbers. In some embodiments, the timer set at 42 may be customized for each of the phone numbers 32.

At 44, the timer set at 42 expires. The computing device 22 collects data from the telephone network 30 at 46. That data indicates respective call activity involving each of the phone numbers 32 under consideration during the time between when the timer is set at 42 and when the timer expires at 44.

For each of the phone numbers 32, the computing device 22 determines at 48 whether there has been at least one successful call to the phone number 32 under consideration. For each of the phone numbers 32 that had at least one call to it that was successfully answered, the computing device 22 proceeds to the step shown at 42 where the computing device 22 resets the timer. If, on the other hand, any of the phone numbers 32 under consideration was not involved in any successful calls during the time period under consideration, at 50 the computing device 22 places a test call to that phone number 32.

At 52, the computing device 22 determines whether the test call was successful. If so, the computing device proceeds to the step at 42 and resets the timer. If the test call is not successful, that indicates a problem with the phone number 32 that was called during the test call and the computing device 22 provides a corresponding notification at 54.

In addition to identifying any phone number(s) 32 to which a test call is placed and not successful, the system 20 is capable of identifying potential problems based on other criteria. For example, the computing device 22 considers an answer-seizure ratio for each of the phone numbers 32. When the answer-seizure ratio for any of the phone numbers 32 is below a predetermined threshold, the computing device 22 provides an indication of a potential problem with any such phone number.

In some embodiments, the call activity data that is processed by the computing device 22 includes a duration of any calls during the time period. Shorter call durations may indicate, for example, dropped calls or poor call quality resulting in one of the parties terminating the call sooner than it otherwise might have been. The computing device 22 determines an average call duration for each phone number during the time period. The computing device 22 generates an indication of a potential problem with a phone number 32 when the average call duration during the time period for that phone number 32 is shorter than average call durations to that phone number during previous time periods.

The average call duration in other embodiments is based on call durations for a set of phone numbers 32 that are expected to be used for calls that last approximately the same amount of time. When one phone number 32 in such a set of phone numbers 32 has an average call duration that is sufficiently lower than the average for the set, that indicates a potential problem with that phone number 32.

The system 20 is also capable of identifying potential problems with geographic locations or areas served by the telephone network 30 by, for example, determining that multiple calls placed from a particular area are not successful. Such circumstances may be a result of a problem with the network servicing that area instead of a problem with the called phone number(s) 32. The computing device 22 in some embodiments is configured to determine when any of the phone numbers 32 is successfully receiving calls from some areas but not from at least one area to identify any areas that may be the source of a problem.

The example disclosed system and method provide automated phone number monitoring that is fully automated and improves the economies associated with identifying and remedying problems with phone numbers.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A method of monitoring a phone number, comprising:
   automatically generating data indicating call activity involving a phone number during a time period having a preselected duration;
   automatically determining that the data indicates that there were no successfully answered calls placed to the phone number during the time period;
   automatically placing a test call to the phone number based on determining that there were no successfully answered calls placed to the phone number during the time period;
   automatically determining whether the test call was successful;
   automatically generating an indication of a problem with the phone number if the test call was not successful;
   determining a baseline expectation of answered calls placed to the phone number based on the data associated with a prior time period; and
   generating an indication of a potential problem with the phone number when a quantity of answered calls placed to the phone number during the time period is less than the baseline expectation.

2. The method of claim 1, wherein the data includes an answer-seizure ratio and the method comprises determining whether the answer-seizure ratio is below a preselected threshold and generating an indication of a potential problem with the phone number when the answer-seizure ratio is below the threshold.

3. The method of claim 1, wherein the data includes a duration of any calls during the time period and the method comprises determining an average call duration during the time period and generating an indication of a potential problem with the phone number when the average call duration during the time period is shorter than average call durations during previous time periods.

4. The method of claim 1, wherein the data includes information regarding call originating locations of calls placed to the phone number and the method comprises generating an indication of a potential problem associated with any location including failed attempted calls to the phone number.

5. The method of claim 1, wherein the preselected duration is based on expected call activity involving the phone number.

6. The method of claim 5, wherein the preselected duration is an hour.

7. The method of claim 1, comprising performing the entire method on a telephony platform that comprises at least one processor and memory associated with the at least one processor.

8. A system for monitoring phone numbers, comprising:
   a computing device including at least one processor and memory associated with the at least one processor; and
   a telephone network including a plurality of telephone numbers, wherein the computing device is configured to:
   obtain data directly from the telephone network, the data indicating call activity involving the phone numbers, respectively, during a time period having a preselected duration;
   automatically determine, for each of the phone numbers, whether the data indicates that there were no successfully answered calls placed to the phone number during the time period;
   automatically place a test call to any of the phone numbers for which there were no successfully answered calls placed to the phone number during the time period;
   for each of the phone numbers to which a test call was placed, automatically determine whether the test call was successful;
   for any of the phone numbers to which the test call was not successful, automatically generate an indication of a problem with the phone number;
   determine, for each of the phone numbers, a baseline expectation of answered calls placed to the respective phone number based on the data associated with a prior time period; and
   generate an indication of a potential problem with the respective phone number when a quantity of answered calls placed to the phone number during the time period is less than the baseline expectation.

9. The system of claim 8, wherein the data includes an answer-seizure ratio and the computing device is configured to determine whether the answer-seizure ratio is below a preselected threshold and generate an indication of a potential problem with an identified one of the phone numbers when the answer-seizure ratio of the identified one of the phone numbers is below the threshold.

10. The system of claim 8, wherein the data includes a duration of any calls during the time period and the computing device is configured to determine an average call duration for each of the phone numbers during the time period and generate an indication of a potential problem with an identified one of the phone numbers when the average call duration for the identified one of the phone numbers during the time period is shorter than average call durations for the identified one of the phone numbers during previous time periods.

11. The system of claim 8, wherein the data includes information regarding call originating locations of calls placed to the phone numbers and the computing device is configured to generate an indication of a potential problem associated with any location including failed attempted calls to any of the phone numbers.

12. The system of claim 11, wherein the computing device is configured to:
   determine when any of the phone numbers is successfully receiving calls from some of the call originating locations but not from at least one of the call originating locations; and
   identify the at least one of the call originating locations as being a source of the potential problem.

* * * * *